(12) United States Patent
Chen

(10) Patent No.: US 7,856,139 B2
(45) Date of Patent: Dec. 21, 2010

(54) SIGNAL CORRECTING METHOD

(75) Inventor: Zhe-Hong Chen, Fort Collins, CO (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/656,617

(22) Filed: Feb. 4, 2010

(65) Prior Publication Data

US 2010/0142817 A1 Jun. 10, 2010

Related U.S. Application Data

(60) Division of application No. 11/316,923, filed on Dec. 27, 2005, now Pat. No. 7,684,615, which is a continuation of application No. PCT/JP2004/009138, filed on Jun. 29, 2004.

(30) Foreign Application Priority Data

Jun. 30, 2003 (JP) .............................. 2003-188428

(51) Int. Cl.
*G06K 9/00* (2006.01)
*G06K 9/40* (2006.01)
*H04N 5/14* (2006.01)

(52) U.S. Cl. ....................... 382/162; 382/254; 348/576; 358/518

(58) Field of Classification Search ......... 382/162–163, 382/167, 254, 260–262, 270, 272, 274, 275; 348/222.1, 223.1, 273–280, 576–578, 582, 348/603–717; 358/518–522
See application file for complete search history.

(56) References Cited

U.S. PATENT DOCUMENTS

| 5,119,186 | A |   | 6/1992  | Deacon et al. |
|-----------|---|---|---------|---------------|
| 5,220,620 | A | * | 6/1993  | Nakano et al. ............. 382/167 |
| 5,229,847 | A |   | 7/1993  | Gibson |
| 6,028,628 | A |   | 2/2000  | Van Der Valk |
| 6,125,213 | A | * | 9/2000  | Morimoto .................... 382/263 |
| 6,300,983 | B1| * | 10/2001 | Fels et al. .................... 348/580 |
| 6,480,624 | B1|   | 11/2002 | Horie et al. |

(Continued)

FOREIGN PATENT DOCUMENTS

EP 422544 A2 4/1991

(Continued)

OTHER PUBLICATIONS

Lee; "Digital Image Smoothing and the Sigma Filter"; Computer Vision, Graphics, and Image Processing 24, 1983, pp. 255-269.

(Continued)

*Primary Examiner*—Manav Seth
(74) *Attorney, Agent, or Firm*—Oliff & Berridge, PLC

(57) ABSTRACT

A signal correcting method includes: obtaining multiple types of signals at each of a plurality of points; extracting a point with signal values corresponding to the multiple types of signals, which have a predetermined relationship to signal values of the multiple types of signals at a target point; and correcting the multiple types of signals at the target point based upon the signal values corresponding to the multiple types of signals at the target point and the signal values corresponding to the multiple types of signals at the extracted point.

3 Claims, 8 Drawing Sheets

U.S. PATENT DOCUMENTS

| | | | |
|---|---|---|---|
| 6,487,309 | B1 | 11/2002 | Chen |
| 6,542,187 | B1 | 4/2003 | Hamilton, Jr. et al. |
| 6,552,734 | B1 | 4/2003 | Rozin |
| 6,570,612 | B1 | 5/2003 | Saund et al. |
| 6,570,616 | B1 | 5/2003 | Chen |
| 6,671,401 | B1 | 12/2003 | Adams, Jr. et al. |
| 6,977,681 | B1 | 12/2005 | Sasai |
| 7,333,139 | B2 | 2/2008 | Okamoto |
| 2001/0052938 | A1 | 12/2001 | Itoh |
| 2002/0001409 | A1 | 1/2002 | Chen et al. |
| 2003/0174221 | A1 | 9/2003 | Tsuda |
| 2004/0080639 | A1 | 4/2004 | Ishiga |
| 2004/0105015 | A1 | 6/2004 | Tsukioka |
| 2006/0022995 | A1 | 2/2006 | Chang |
| 2006/0262186 | A1 | 11/2006 | Avni et al. |
| 2007/0268301 | A1 | 11/2007 | Dumitras et al. |
| 2008/0055332 | A1 | 3/2008 | Dumitras et al. |

FOREIGN PATENT DOCUMENTS

| | | |
|---|---|---|
| JP | A-64-011474 | 1/1989 |
| JP | A 1-114174 | 5/1989 |
| JP | A 3-85972 | 4/1991 |
| JP | A-10-207490 | 8/1998 |
| JP | A 11-110551 | 4/1999 |
| JP | A 11-215512 | 8/1999 |
| JP | A 2000-224601 | 8/2000 |
| JP | A 2000-341707 | 12/2000 |
| JP | A 2002-10274 | 1/2002 |
| JP | A 2003-101851 | 4/2003 |
| JP | A 2003-102025 | 4/2003 |
| JP | A 2004-48465 | 2/2004 |
| JP | A 2004-228931 | 8/2004 |
| JP | A 2004-229232 | 8/2004 |
| WO | WO 02/30100 A2 | 4/2002 |

OTHER PUBLICATIONS

Supplementary European Search Report issued in European Patent Application No. 04 74 6607.3 mailed on Sep. 1, 2010.

K.N. Plataniotis et al., "Color Image Processing Using Adaptive Vector Directional Filters," IEEE Transactions on Circuits and Systems - II: Analog and Digital Signal Processing, vol. 45, No. 10, pp. 1414-1419, (Oct. 1998).

R. Lukac et al., "Angular Multichannel Sigma Filter," IEEE International Conference on Acoustics, Speech and Signal Processing, pp. 745-748, (Apr. 2003).

M. Ciuc et al., "Filtering Noise in Color Images Using Adaptive-Neighborhood Statistics," Journal of Electronic Imaging, vol. 9, No. 4, pp. 484-494, (Oct. 2000).

* cited by examiner

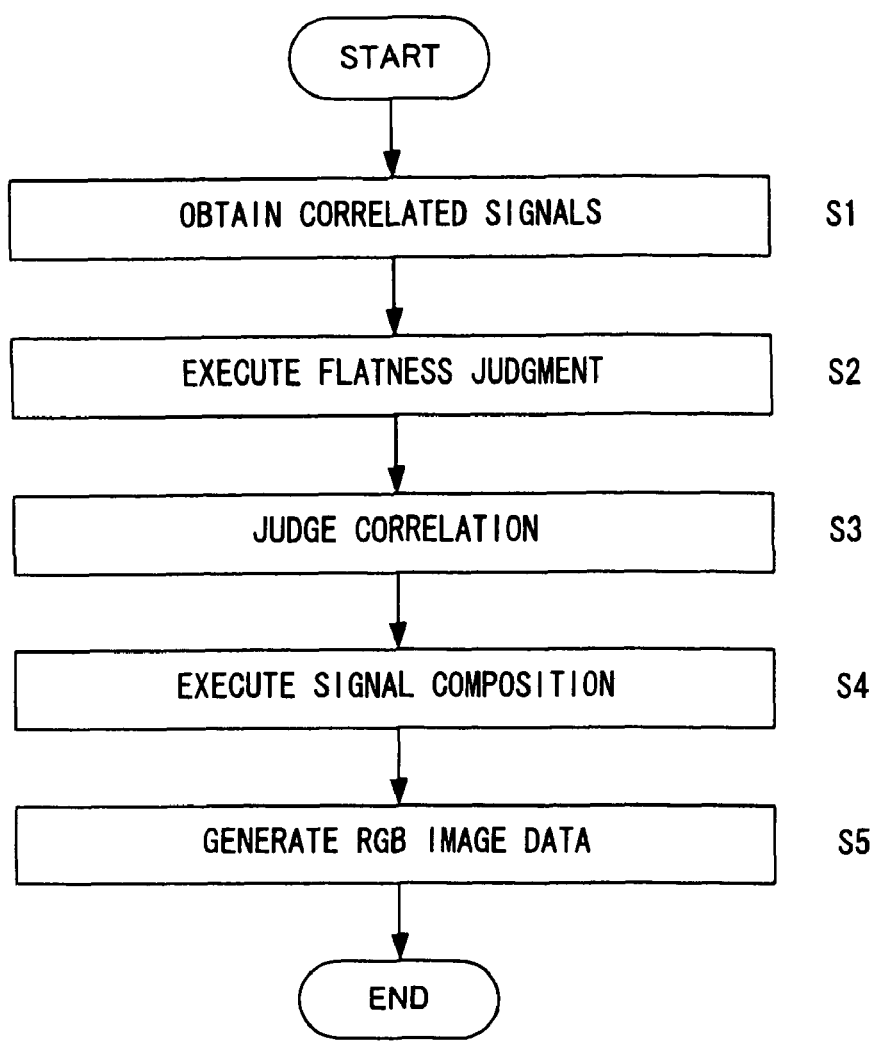

FIG.11

AREA 1  $\begin{array}{|c|c|}\hline R & G \\\hline G & B \\\hline\end{array}$ ➡ $\begin{array}{|c|c|}\hline -\Delta E & G \\\hline G & +\Delta E \\\hline\end{array}$ ➡ $Cr1' = Cr1 + \Delta E$
$Cb1' = Cb1 - \Delta E$ AREA 2  $\begin{array}{|c|c|}\hline R & G \\\hline G & B \\\hline\end{array}$ ➡ $\begin{array}{|c|c|}\hline +\Delta E & G \\\hline G & -\Delta E \\\hline\end{array}$ ➡ $Cr2' = Cr2 - \Delta E$
$Cb2' = Cb2 + \Delta E$

FIG.12

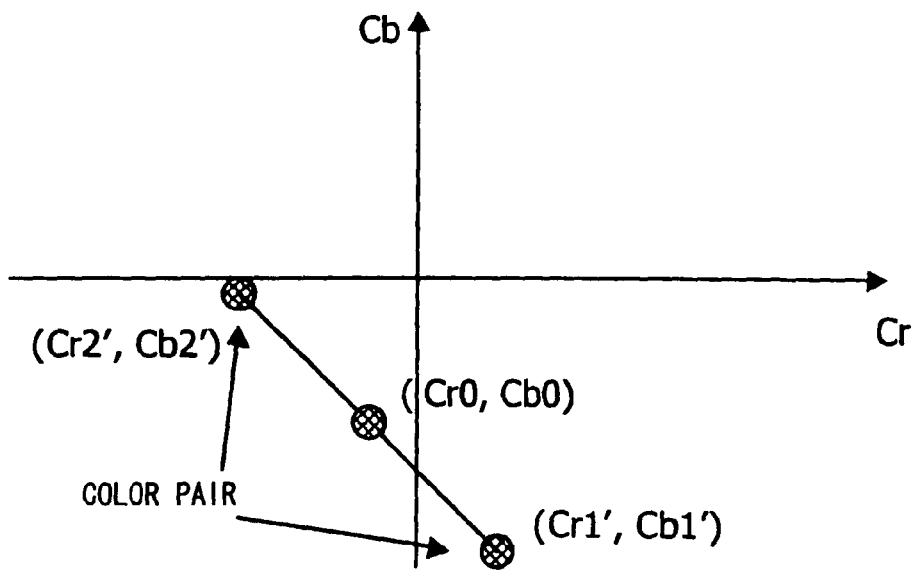

FIG.13

AREA 1  $\begin{array}{|c|c|}\hline R & G \\\hline G & B \\\hline\end{array}$ ➡ $\begin{array}{|c|c|}\hline -\Delta E & G \\\hline G & -\Delta E \\\hline\end{array}$ ➡ $Cr1' = Cr1 + \Delta E$
$Cb1' = Cb1 + \Delta E$ AREA 2  $\begin{array}{|c|c|}\hline R & G \\\hline G & B \\\hline\end{array}$ ➡ $\begin{array}{|c|c|}\hline +\Delta E & G \\\hline G & +\Delta E \\\hline\end{array}$ ➡ $Cr2' = Cr2 - \Delta E$
$Cb2' = Cb2 - \Delta E$

SIGNAL CORRECTING METHOD

This is a Divisional of U.S. patent application Ser. No. 11/316,923 filed on Dec. 27, 2005, which is a continuation of International Application No. PCT/JP2004/009138 filed Jun. 29, 2004 which is hereby incorporated by reference in its entirety.

INCORPORATION BY REFERENCE

The disclosures of the following applications are herein incorporated by reference:

Japanese Patent Application No. 2003-188428 filed Jun. 30, 2003

International Application No. PCT/JP2004/009138 filed Jun. 29, 2004.

BACKGROUND OF THE INVENTION

1. Field of the Invention

The present invention relates to a signal correcting method that may be adopted when correcting signals such as image signals.

2. Description of Related Art

There are technologies known in the related art for generating RGB image data by capturing an image at an image sensor constituted with color filters disposed in an RGB Bayer array. The electrical charge signals at the individual pixels of such an image sensor may be read out through two channels so as to speed up the read operation. The electrical charge signals having been read out via the two channels are amplified to a predetermined level with amplifiers each corresponding to one of the channels, and the amplified signals then undergo A/D conversion and the like to generate RGB image data. Various types of noise introduced in the read circuit, the amplifiers and the like may be present in the RGB image data thus generated. Such noise may be reduced by applying a low pass filter with a predetermined range to the image data. Namely, the average of the values indicated in the nearby pixels present within a predetermined range containing the target pixel is determined and is then used to substitute the signal value at the target pixel. This processing is sequentially executed for all the pixels (see, for instance, Japanese Laid Open Patent Publication No. 2000-341707).

SUMMARY OF THE INVENTION

However, since the low pass filter has a specific range, low-frequency noise may remain unprocessed, which may manifest as color mottling noise. Such noise is particularly conspicuous in a flat image area.

The present invention provides a signal correcting method for effectively correcting a plurality of signals containing noise and the like.

According to the 1st aspect of the invention, a signal correcting method comprises: obtaining multiple types of signals at each of a plurality of points; extracting a point with signal values corresponding to the multiple types of signals, which have a predetermined relationship to signal values of the multiple types of signals at a target point; and correcting the multiple types of signals at the target point based upon the signal values corresponding to the multiple types of signals at the target point and the signal values corresponding to the multiple types of signals at the extracted point.

According to the 2nd aspect of the invention, in the signal correcting method according to the 1st aspect, it is preferred that the predetermined relationship is equivalent to a relationship whereby when the multiple types of signals, are plotted in a coordinate system with multiple dimensions, the number of which matches the number of the multiple signal types, the extracted point is substantially present on a straight line with a predetermined slope passing through a coordinate point determined by the signal values corresponding to the multiple types of signals at the target point.

According to the 3rd aspect of the invention, in the signal correcting method according to the 2nd aspect, it is preferred that the predetermined slope is determined based upon gains at a plurality of amplifiers provided each in correspondence to one of the multiple types of signals.

According to the 4th aspect of the invention, in the signal correcting method according to the 2nd aspect, it is preferred that the predetermined slope is determined based upon a state of distribution of signal values corresponding to the multiple types of signals at the plurality of points.

According to the 5th aspect of the invention, in the signal correcting method according to any of the 1st through 4th aspects, it is preferred that the plurality of points are present at points whose physical positions are substantially different from one another.

According to the 6th aspect of the invention, in the signal correcting method according to any of the 1st through 4th aspects, it is preferred that the plurality of points are present at points that are substantially different from one another in time sequence.

According to the 7th aspect of the invention, in the signal correcting method according to any of the 1st through 6th aspects, it is preferred that average values each corresponding to one of the multiple types of signals are calculated by using the signal values of the multiple types of signals at the target point and the signal values of the multiple types of signals at the extracted point and the signal values of the multiple types of signals at the target point are replaced with the average values having been calculated.

According to the 8th aspect of the invention, in the signal correcting method according to any of the 1st through 7th aspects, it is preferred that the multiple types of signals are correlated to one another.

According to the 9th aspect of the invention, in the signal correcting method according to any of the 1st through 8th aspects, it is preferred that multiple types of signals indicate flatness among individual points.

According to the 10th aspect of the invention, a signal correcting method comprises: obtaining image data containing color-related signals in correspondence to individual pixels; and substituting a signal value of the color-related signal at a target pixel with an average value calculated by using the signal value of the color-related signal at the target pixel and a signal value of the color-related signal at a nearby pixel, when the color-related signal at the target pixel and the color-related signal at the nearby pixel are judged to be symmetrical to each other relative to a specific color.

According to the 11th aspect of the invention, in the signal correcting method according to the 10th aspect, it is preferred that: the color-related signals are color difference signals corresponding to a color difference Cb component and a color difference Cr component; and when the color-related signal at the target pixel and the color-related signal at the nearby pixel are symmetrical to each other relative to the specific color, a straight line connecting a point determined by the color difference Cr component and the color difference Cb component at the target pixel and a point determined by the color difference Cr component and the color difference Cb component at the nearby pixel has a slope which is substantially +1 or −1 in a Cr-Cb coordinate system.

According to the 12th aspect of the invention, in the signal correcting method according to the 10th or the 11th aspect, it is preferred that the image data containing the color-related signals in correspondence to the individual pixels are image data expressed in an RGB colorimetric system, which have been generated by using image data containing a color signal representing a single color component among R, G and B in correspondence to a given pixel.

According to the 13th aspect of the invention, a signal correcting method comprises: obtaining image data containing at least a first hue signal and a second hue signal in correspondence to each pixel; and substituting a signal value of the first hue signal at a target pixel with an average of the signal value of the first hue signal at the target pixel and a signal value of the first hue signal at a nearby pixel, and a signal value of the second hue signal at the target pixel with an average of the signal value of the second hue signal at the target pixel and a signal value of the second hue signal at the nearby pixel, when the signal value of the first hue signal at the target pixel and the signal value of the first hue signal at the nearby pixel are determined to be symmetrical to each other relative to a signal value of the first hue signal corresponding to a specific color and the signal value of the second hue signal at the target pixel and the signal value of the second hue signal at the nearby pixel are determined to be symmetrical to each other relative to a signal value of the second hue signal corresponding to the specific color.

According to the 14th aspect of the invention, a computer-readable computer program product comprises a signal correction processing program that enables a computer to execute steps in a signal correcting method according to any of the 1st through the 13th aspects.

According to the 15th aspect of the invention, in the computer program product according to the 14th aspect, it is preferred that the computer program product is a computer-readable recording medium having recorded therein the signal correction processing program.

According to the 16th aspect of the invention, a signal correction processing apparatus comprises a control device that executes steps of a signal correcting method according to any of the 1st through 13th aspects.

BRIEF DESCRIPTION OF THE DRAWINGS

FIG. 5 presents a flowchart of the noise removal processing executed by the control device;

FIG. 6 shows the buffers for the two signals A and B;

FIG. 11 shows a color pair present on a straight line extending at a −45° angle;

FIG. 12 shows the color pair present on the straight line extending at the −45° angle in the CrCb coordinate system;

FIG. 13 shows the color pair present on a straight line extending at a +45° angle;

DESCRIPTION OF PREFERRED EMBODIMENT(S)

First Embodiment

Figure 1:
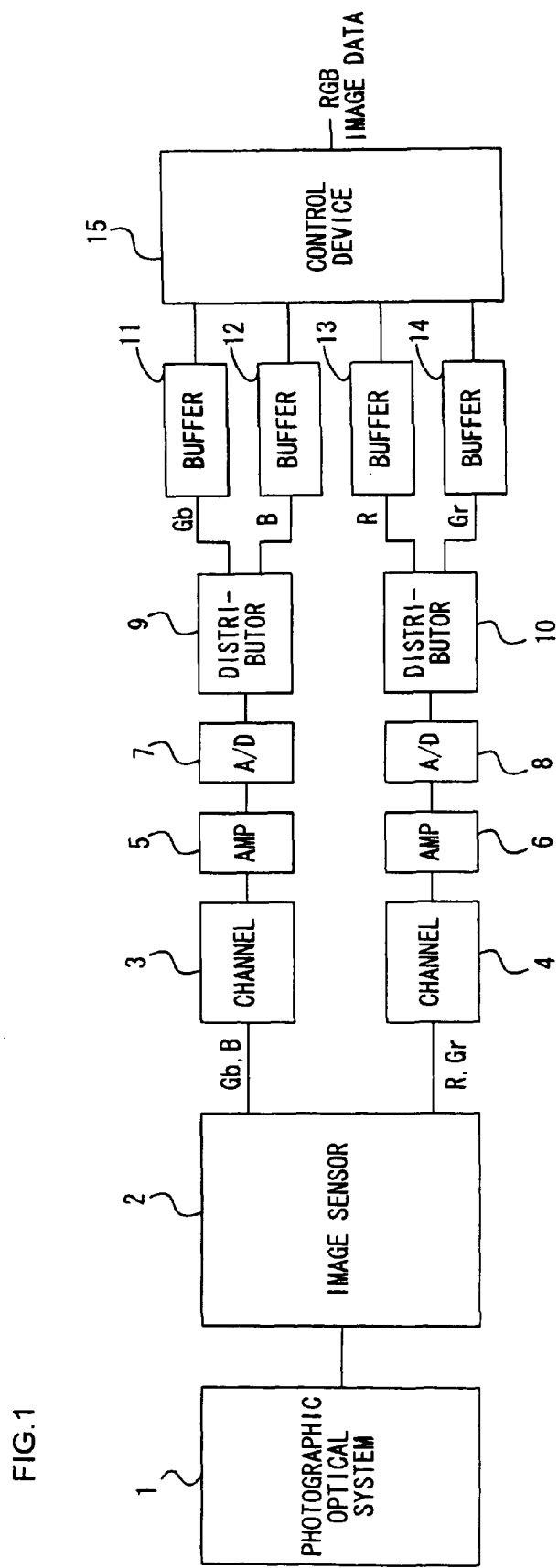
FIG. 1 shows the structure adopted in the electronic camera achieved in the first embodiment.

FIG. 1 shows the structure adopted in the electronic camera (digital camera) achieved in the first embodiment of the present invention. A subject image is formed at the image-capturing surface of an image sensor (or an image-capturing element) 2 via a photographic optical system 1 constituted with a photographic lens and the like. The image sensor 2 includes color filters disposed in an RGB Bayer array and executes photoelectric conversion of the subject image formed at the image-capturing surface thereof in units of individual pixels. The electrical charges at the pixels, resulting from the photoelectric conversion are read out via two channels, a channel 3 and a channel 4, so as to speed up the read operation.

Figure 2:
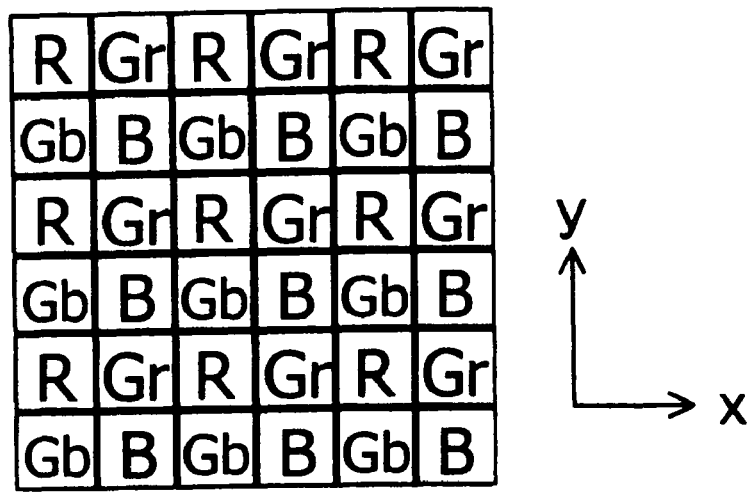
FIG. 2 shows a Bayer array.

FIG. 2 presents an example of the image sensor 2 with color filters disposed in an RGB Bayer array. It may execute a vertical (y direction) transfer for each pair of rows extending along the horizontal direction (x direction) so as to read out the electrical charges in an odd-numbered row and the electrical charges in an even-numbered row sequentially along the horizontal direction respectively via the channel 3 and the channel 4 with the same timing. Assuming that the lowermost row is an odd-numbered row, pixels corresponding to color components Gb, B, Gb, B . . . , are present in each odd-numbered row, whereas pixels corresponding to color components R, Gr, R, Gr . . . , are present in each even-numbered row. Accordingly, the electrical charges in the odd-numbered row, i.e., the electrical charges corresponding to the color components Gb, B, Gb, B . . . , are always read out via the channel 3 and the electrical charges in the even-numbered row, i.e., the electrical charges corresponding to the color components R, Gr, R, Gr . . . , are always read out via the channel 4.

The electrical charge signals having been read out via the channels 3 and 4 are amplified at a specific gain by amplifiers (AMP) 5 and 6 respectively and then are converted to digital data at A/D converters 7 and 8. The signals having been converted to digital data are then sequentially stored into buffers 11 through 14 via distributors 9 and 10. The distributor 9 sequentially sorts Gb-component color signals (data) and B-component color signals (data) read out alternately in series and stores them into the buffers 11 and 12 respectively. The Gb-component color signals are stored in the buffer 11, whereas the B-component color signals are stored in the buffer 12. The distributor 10 sequentially sorts R-component color signals (data) and Gr-component color signals (data) read out alternately in series and stores them into the buffers 13 and 14 respectively. The R-component color signals are stored in the buffer 13, whereas the Gr-component color signals are stored in the buffer 14.

A control device 15 processes the data stored in the individual buffers as described later and generates RGB image data. It is constituted with a microprocessor and its peripheral circuits and executes a specific control program stored in a ROM (not shown). It is to be noted that the control device 15 may be constituted with an ASIC.

Various types of analog noise introduced at the read circuit, which includes the image sensor 2, the channels 2 and 4, the amplifiers 5 and 6 and the like may be present in the data generated in the structure adopted in the first embodiment. In addition, since the signals are read out through two channels as explained above in the first embodiment, the signals read through the two channels are correlated and there is also a correlation between the noise carried through one of the channels and the noise carried through the other channel. The present invention is characterized in that noise contained in signals having such correlation is effectively removed or corrected by taking advantage of the characteristics of the correlation.

The following is an explanation of the principal of the noise removal achieved in the embodiment. A and B represent two correlated signals, S represents a true signal and N represents noise. The signals A and B can be expressed as in (1) and (2) below.

$$A = Sa + Na \quad (1)$$

$$B = Sb + Nb \quad (2)$$

The two correlated signals to be corrected in the embodiment may be, for instance, the signal A, which is a B-component signal (data) obtained via the channel 3, and the signal B, which is an R component signal (data) obtained via the channel 4. Since the term "data" and the term "signal" are synonymous in this context, the term "signal" is also used to refer to digital data for convenience in the following explanation.

Signals A0 and B0 at a given target point, the signal A0 constituted with a true value Sa0 and noise Na0 and the signal B0 constituted with a true value Sb0 and noise Nb0, can be respectively expressed as in (3) and (4) below. Since each pixel in a Bayer array holds a color signal corresponding to a single color component, the term "target point" refers to a four-pixel block that includes an R pixel, a Gr pixel, a Gb pixel and a B pixel in this context. The same principle applies to other "points".

$$A0 = Sa0 + Na0 \quad (3)$$

$$B0 = Sb0 + Nb0 \quad (4)$$

Figure 3:
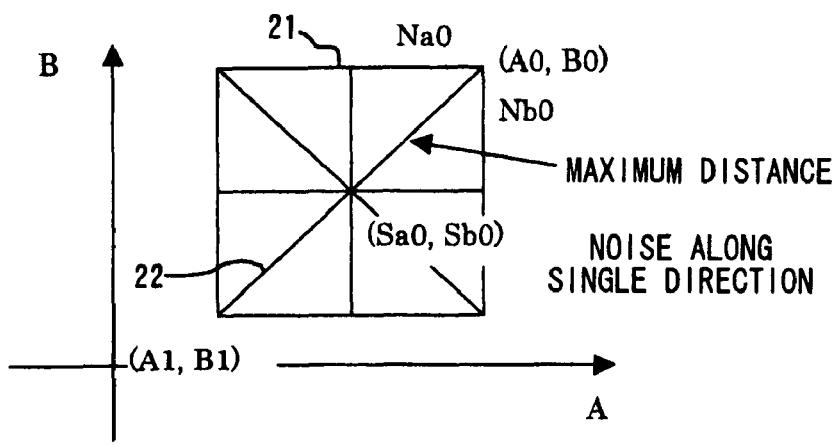
FIG. 3 shows the distribution of signals A and B containing noise in an example in which the signals at the target point are present in the upper right corner of the quadrangle.

FIG. 3 shows the distribution of the signals A and B respectively containing noise Na and noise Nb, with the signals A0 and B0 at the target point present at the upper right corner in a quadrangle 21. In FIG. 3, the signal A is indicated along the horizontal axis and the signal B is indicated along the vertical axis and, accordingly, this coordinate system is hereafter referred to as an AB coordinate system. The explanation is given on the premise that the signals A and B correspond to a flat (or even) area. The word "flat" (or "even") is used in the explanation of the first embodiment, in which the two correlated signals are a B component signal and an R component signal, to mean that the area contains a uniform color. In addition, the true values of the signals A and B at various points within the flat area are invariably Sa0 and Sb0 respectively.

The quadrangle 21 indicates the range of the distribution of the signals A and B containing the noise Na and the noise Nb. The noise Na in the signal A and the noise Nb in the signal B both register the maximum values along the positive direction at the upper right corner of the quadrangle 21. The noise Na in the signal A and the noise Nb in the signal B both register the maximum values along the negative direction at the lower left corner of the quadrangle 21. The noise Na in the signal A registers the maximum values along the negative direction and the noise Nb in the signal B registers the maximum values along the positive direction at the upper left corner of the quadrangle 21. The noise Na in the signal A registers the maximum values along the positive direction and the noise Nb in the signal B registers the maximum values along the negative direction at the lower right corner of the quadrangle 21.

Since the signals A0 and B0 at the target point in FIG. 3 are located at the upper right corner of the quadrangle 21, they contain the maximum values +Na0 and +Nb0 of the noise along the positive direction. The noise contained in the signals A0 and B0 at the target point can be most effectively removed by detecting signals A1 and B1 located at the lower left corner of the quadrangle 21 that contain the opposite noise components −Na0 and −Nb0 and taking the averages of the signals. The signals A1 and B1 can be expressed as in (5) and (6) below.

$$A1 = Sa0 - Na0 \quad (5)$$

$$B1 = Sb0 - Nb0 \quad (6)$$

The signals A0 and B0 at the target point and the signals A1 and B1 containing the opposite noise components are located on a diagonal line 22. This diagonal line 22 has a slope k expressed as k=Nb0/Na0. The middle of the diagonal line 22 is indicated as Sa0, Sb0, with Sa0 and Sb0 respectively representing the true values of the signals A0 and B0 at the target point. However, the signals A1 and B1 containing the opposite noise components cannot easily be identified. On the premise that noise occurs randomly and evenly, the average values of the signals at various points on the diagonal line passing through the target point with the signals A0 and B0 can be assumed to be exactly Sa0 and Sb0.

Accordingly, once the signals A0 and B0 at the target point are acquired, a diagonal line on the AB coordinate system, which passes through the point corresponding to the signals A0 and B0 with the slope k is determined in the embodiment. Then, the average values of the signals A and B at various points on the diagonal line are calculated and these average values are used to substitute the values of the signals A0 and B0 at the target point. As a result, the values of the signals containing noise at the target point are corrected to the true values.

It is to be noted that if the signals A0 and B0 at the target point are located at the upper left corner in FIG. 3, their noise can be most effectively removed by detecting the signals in the lower right corner and taking the average values of those signals. Accordingly, a diagonal with a slope k expressed as k=−Nb0/Na0 should be determined and the average values among points present on this diagonal line should be calculated in this case, in a manner similar to that described above. During this process, it is crucial to correctly determine whether the diagonal line should have a slope +k or a slope −k and to set an optimal value for the slope k. These matters are to be explained later.

Figure 4:
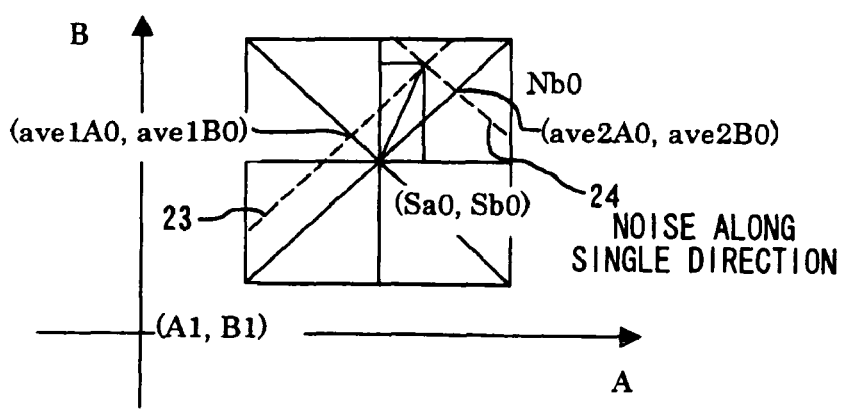
FIG. 4 shows the distribution of signals A and B containing noise in an example in which the signals at the target point are present further inside the quadrangle.

Next, an explanation is given on the case in which the signals A0 and B0 at the target point contain noise with values less than the maximum noise values. FIG. 4, which is similar to FIG. 3, shows an example of the signals A0 and B0 at the target point located further inside the quadrangle 21. ave1A0 and ave1B0 represent the average values among signal values at various points present on a straight line 23 with the slope k, which passes through the point corresponding to the signals A0 and B0 at the target point. ave2A0 and ave2B0 represent the average values among signal values at various points present on a straight line 24 with the slope −k. In this situation, the middle point corresponding to ave1A0 and ave1B0 of the dotted line 23 with a greater length is closer to the central point of the quadrangle corresponding to Sa0 and Sb0. It is to be noted that the dotted line with the greater length can be regarded to have a greater number of signal samples.

Thus, even when the slope of the straight line passing through the point corresponding to the signals A0 and B0 located at the target point and the point corresponding to the true values is not ±k, a desired level of noise (error) reduction can be achieved by averaging the values of the signals present on a straight line with the slope +k or −k, as FIG. 4, which shows the coordinate point corresponding to the average values ave1A0 and ave1B0 located significantly closer to the coordinate point of the true values Sa0 and Sb0 than the coordinate points corresponding to the signals A0 and B0 located at the target point, clearly indicates.

FIG. 5 presents a flowchart of the noise removal processing executed by the control device 15. In step S1, signals (data) corresponding to the Gb component, the B component, the R component and the Gr component are obtained from the buffers 11 through 14. In the embodiment, the B component signal from the buffer 12 and the R component signal from the buffer 13 are processed as two signals correlated to each other. In addition, the Gb component signal from the buffer 11 and the Gr component signal from the buffer 14 are processed as two correlated signals.

In step S2, a decision is made as to whether or not the target area is a flat area based upon the signals having been obtained. The noise removal processing in the embodiment is intended for flat image areas. The term "flat" is used in conjunction with the combination of the B component signal and the R component signal to refer to uniformity of color. In conjunction with the combination of the signals corresponding to the G component, the term "flat" is used to refer to uniformity of luminance (or brightness).

FIG. 6 shows the buffers of the two signals A and B. For instance, when the two components are the B component signal and the R component signal, the buffers are the buffer 12 and the buffer 13. ±n signals (data) around the target point (target pixel) can be stored in a buffer. If the signals read from these buffers satisfy the condition expressed below, the target area is considered to be flat. Namely, if the differences between the values indicated by the signals at the target point (0) and the values indicated by the signals at a reference point (i) are equal to or less than predetermined values thA and thB, A0 and Ai and B0 and Bi are regarded to indicate flatness. Values which are considerably greater than the maximum values of noise should be set for the predetermined values thA and thB.

$$|A0-Ai|<thA \text{ and } |B0-Bi|<thB \tag{7}$$

In step S3, a decision is made as to whether or not correlation exists between the signals A0, B0 at the target point and the signals Ai, Bi at the reference point having been determined to indicate flatness. This decision may be made by determining whether or not the signals Ai and Bi at the reference point are present on the straight line with the slope ±k passing through the coordinate point corresponding to the signals A0 and B0 at the target point in the AB coordinate system, as explained earlier. More specifically, it is decided that they are correlated if either of the conditions expressed in (8) and (9) below is satisfied. a indicates an allowable error which is included so as to allow a certain degree of leeway with regard to the slope k.

$$(B0-Bi)/(A0-Ai)=+k\pm a \tag{8}$$

$$(B0-Bi)/(A0-Ai)=-k\pm a \tag{9}$$

If the condition expressed in (8) is satisfied, an arithmetic operation expressed in (10) through (12) below is executed, whereas if the condition expressed in (9) is satisfied, an arithmetic operation expressed in (13) through (15) below is executed.

$$\text{Sum}A\text{plus}=\text{Sum}A\text{plus}+Ai \tag{10}$$

$$\text{Sum}B\text{plus}=\text{Sum}B\text{plus}+Bi \tag{11}$$

$$N\text{plus}=N\text{plus}+1 \tag{12}$$

$$\text{Sum}A\text{minus}=\text{Sum}A\text{minus}+Ai \tag{13}$$

$$\text{Sum}B\text{minus}=\text{Sum}B\text{minus}+Bi \tag{14}$$

$$N\text{plus}=N\text{plus}+1 \tag{15}$$

The processing in steps S2 and S3 is repeatedly executed for reference points i present within a range of −n through +n.

In step S4, signal composition processing is executed. First, the signals to be used for the signal composition are selected.

If Nplus>Nminus, an arithmetic operation expressed as in (16) through (18) is executed.

$$\text{Sum}A=\text{Sum}A\text{plus} \tag{16}$$

$$\text{Sum}B=\text{Sum}B\text{plus} \tag{17}$$

$$N=N\text{plus} \tag{18}$$

If Nplus<Nminus, an arithmetic operation expressed as in (19) through (21) is executed.

$$\text{Sum}A=\text{Sum}A\text{minus} \tag{19}$$

$$\text{Sum}B=\text{Sum}B\text{minus} \tag{20}$$

$$N=N\text{minus} \tag{21}$$

If Nplus=Nminus, an arithmetic operation expressed as in (22) through (24) is executed.

$$\text{Sum}A=(\text{Sum}A\text{plus}+\text{Sum}A\text{minus})/2 \tag{22}$$

$$\text{Sum}B=(\text{Sum}B\text{plus}+\text{Sum}B\text{minus})/2 \tag{23}$$

$$N=(N\text{plus}+N\text{minus})/2 \tag{24}$$

If a great deal of Nplus data is counted and hardly any Nminus data is counted, the signals at the target point are bound to be present either substantially at the upper right corner or substantially at the lower left corner of the quadrangle 21. If a lot of Nminus data is counted the hardly any Nplus is counted, the signals at the target point are bound to be present either substantially at the upper left corner or substantially at the lower right corner of the quadrangle 21. If both Nplus and Nminus data are counted in a certain number of quantities, the signals are present at a position which is not at any of the four corners of the quadrangle 21 and, in this case, either Nplus or Nminus data with a greater count is used. As has been explained in reference to FIG. 4, the values closer to the true values can be determined by selecting the slope of the line with the greater data count.

Next, signal composition is executed as expressed in (25) and (26). Namely, the signal values at the target point are replaced with average values having been determined. Thus, the values of the signals A0 and B0 at the target point are replaced with the signal values of the signals A0' and B0' free of error, and the error is consequently corrected.

$$A0'=\text{AveSum}A=\text{Sum}A/N \quad (25)$$

$$B0'=\text{AveSum}B=\text{Sum}B/N \quad (26)$$

It is to be noted that instead of expressions (25) and (26), expressions (27) and (28) or expressions (29) and (30) may be used.

$$A0'=(A0+\text{Sum}A)/(N+1) \quad (27)$$

$$B0'=(B0+\text{Sum}B)/(N+1) \quad (28)$$

$$A0'=(A0+\text{AveSum}A)/2 \quad (29)$$

$$B0'=(B0+\text{AveSum}B)/2 \quad (30)$$

In step S5, RGB image data are generated based upon the individual RGB signals from which error has been removed. In addition, image processing such as interpolation processing, white balance adjustment and γ correction is executed as necessary.

Next, an explanation is given on how the value of the slope k may be determined. The value of k, which can be assumed to be dependent upon the gains at the amplification circuits 5 and 6, can be determined as expressed in (31) below. GainA represents the gain at the amplification circuit 5 and GainB represents the gain at the amplification circuit 6. If the gains at the amplification circuits 5 and 6 are set at equal value, k=1.

$$k=\text{Gain}A/\text{Gain}B \quad (31)$$

It is to be noted that the value of k may be determined based upon the statistical noise characteristics (the dispersion values, the standard deviation values, the p-p values etc.) of the two signals. For instance, once a diagram of the distribution of the signals A and B such as that shown in FIG. 3, is obtained, the value of k can be determined by using the distribution diagram. The value of k may instead be determined based upon the coefficients used during the white balance adjustment. Namely, the value for k can be determined based upon the various coefficients that will have been selected by the time the noise removal processing is executed. Moreover, restrictions expressed as $\frac{1}{2} \leq |k| \leq 2$ should be applied so as to sustain the correlation between the two signals.

The electronic camera in the first embodiment, which executes the processing described above, achieves the following advantages.

(1) The advantage of low pass filtering processing executed based upon the values of the signals at the target point is gained. Namely, the optimal signals to be used to remove the noise at the target point alone are selected and the signals at the target point are corrected by using the values of the optimal signals. As a result, the signals at the target point can be corrected by removing the noise with a high level of efficiency. In the case of a color image, color mottling is effectively removed through efficient noise removal.

(2) A greater noise removal effect is achieved for more significant noise. Namely, when the target point is present at one of the four corners of the quadrangle 21, the straight line with the slope k passes through the center of the quadrangle 21, which makes it possible to obtain A0' and B0' values closer to the true values.

(3) The limit values (the values at four corners of the quadrangle in FIG. 3) are used only when necessary, and thus, erroneous signal values are not allowed to be used in the calculation executed for purposes of correction. Namely, since the signal values affected by significant noise at the four corners are not used unless the target point is present on a diagonal of the quadrangle in FIG. 3, erroneous correction values are not calculated.

(4) Since a low pass filter effective over a wide range is not required, the processing load is reduced. In other words, the processing load does not need to be very great since the calculation is executed by using the signals present on the straight line with the slope k alone.

It is to be noted that while an explanation is given above in reference to the embodiment on an example in which two-dimensional correction is executed for two correlated signals, the present invention is not limited to this example. It may be adopted in multidimensional correction, e.g., three-dimensional correction executed for three signals with correlation to one another. In the case of three-dimensional correction, the signal values should be corrected by using signals present on the straight line with a specific slope in a three-dimensional coordinate system.

In addition, while an explanation is given above in reference to the embodiments on an example in which image signals provided by an image sensor are processed, the present invention is not limited to this example. For instance, the contents of the embodiment may be adopted in conjunction with audio signals and the like as well. For instance, the two correlated signals may constitute a stereo audio signal obtained through two channels and processing similar to the described above may be executed for the signals output in time sequence. Points at which signals are sampled in time sequence in this case are equivalent to the various points explained earlier. The flat area as referred to in the explanation given earlier corresponds to a time space of uniform sound.

While an explanation is given above in reference to the embodiment on an example in which a four-pixel block that includes an R pixel, a Gr pixel, a Gb pixel and a B pixel is handled as a single point, the present invention is not limited to this example. For instance, if a plurality of signals become available in correspondence to a single pixel through interpolation processing or the like, individual pixels may be handled as a point. The present invention may also be adopted effectively to process a plurality of signals corresponding to different color components which are generated for each pixel by capturing an image with a plurality of image sensors. In addition, a single point may be constituted with an 8-pixel block instead of the 4-pixel block. In other words, the point at which a plurality of signals are observed may be defined in specific units in correspondence to the conditions of the signals undergoing the processing.

While an explanation is given above in reference to the embodiment on an example in which a still image captured with an electronic camera is processed, the present invention is not limited to this example and the contents of the embodiment can be adopted with equal effectiveness to process an image captured with a video camera, for instance. Namely, the contents of the embodiment may be adopted in conjunction with image signals obtained in time sequence along a scanning line.

Moreover, while an explanation is given above in reference to the embodiment on an example in which the present invention is adopted in an electronic camera, the present invention is not limited to this example. For instance, it may be adopted in processing executed on a personal computer, as explained in reference to the second embodiment. Namely, RGB image data generated through an image-capturing operation executed at the image sensor 2 may be read into a personal computer and processed in software on the personal computer. As in the second embodiment, the software program executed on the personal computer can be distributed as a computer-readable computer program product adopting any of various modes including a recording medium and a carrier wave.

Second Embodiment

In reference to the first embodiment, a method for removing noise and the like introduced at the image sensor 2, the channels 3 and 4, the amplifiers 5 and 6 and the like has been explained. Namely, the method achieved in the first embodiment is adopted to remove the adverse effect of noise occurring in hardware circuits. In reference to the second embodiment, a method for removing noise (error) introduced through software processing is explained.

Image data obtained through an image-capturing operation executed at an image sensor that includes color filters disposed in an RGB Bayer array contain color information (a color signal) corresponding to a single color component among R, G and B at each pixel. Interpolation processing is executed in the related art to provide color information corresponding to all the color components for each pixel by using such image data. However, during the interpolation processing, an error, i.e., noise, may be introduced in an interpolation value. This may induce false structure or color artifacts, and in particular, it may induce cyclical color moiré over a range close to the Nyquist frequency, which is bound to lower the image quality.

The extents of color mottling and color moiré may be reduced by disposing an optical low pass filter (OLPF) at a stage preceding the image sensor so as to eliminate in advance the high frequency component in the subject. However, while the occurrence of false structure and color artifacts can be more effectively prevented by using a stronger optical low pass filter, such a strong optical low pass filter is bound to suppress the high frequency component in the image to an excessive degree to result in reduced clarity in the image. There is an alternative method in which the extents of color mottling and color moiré are reduced in a post-processing step executed on a color image having been captured by using a less powerful optical low pass filter or without using an optical low pass filter at all. For instance, an RGB color image may first be converted to image data in an L*a*b* color space and then median filter processing may be executed on the a*b* plane over a large radius to reduce the extent of color moiré.

However, there arises the risk of destroying normal color tones during the process of reducing color mottling and color moiré when the method described above is adopted. Furthermore, since the load of such median filter processing is significant, the processing may become time-consuming or may require a large scale circuit. The second embodiment provides the signal correcting method for effectively reducing the extents of color mottling and color moiré while, as much as possible, retaining normal color tones. A basic principle of noise (error) removal similar to that of the first embodiment is adopted.

Figure 7:
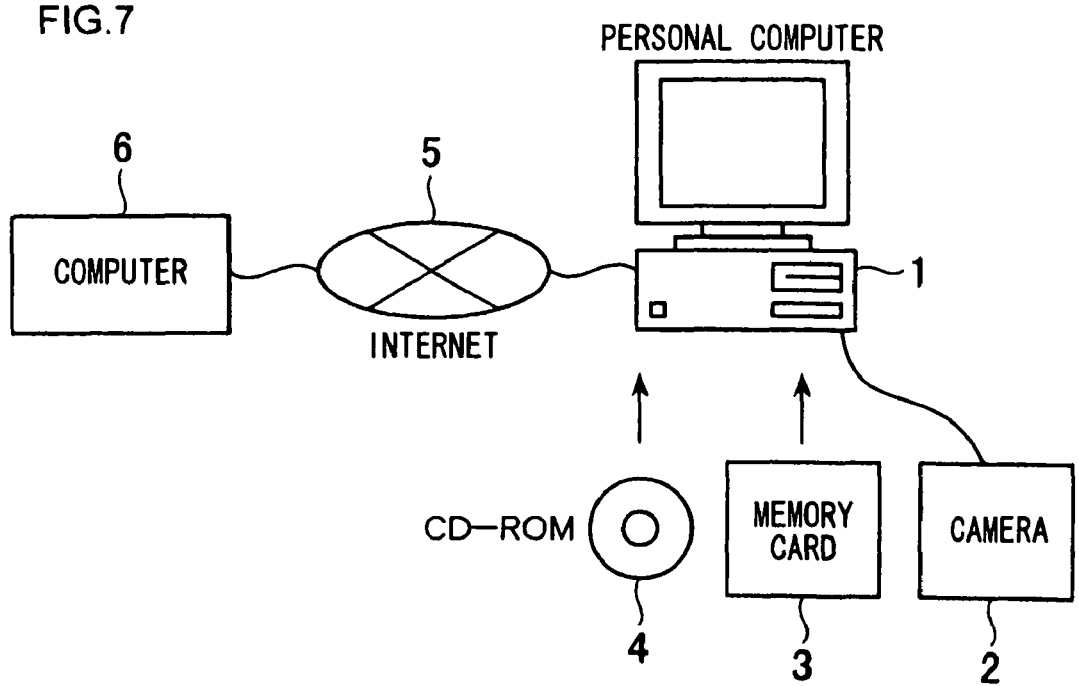
FIG. 7 shows the personal computer on which the image processing program achieved in the second embodiment is executed.

FIG. 7 shows a personal computer 101 used in the second embodiment. The image processing program explained below is executed on the personal computer 101. The personal computer 101 receives color image data captured at a digital camera 102 connected thereto. In addition, color image data obtained through an image-capturing operation executed at the digital camera 102 can be received at the personal computer 101 via a memory card 103. The personal computer 101 is also able to obtain color image data recorded in a recording medium such as a CD-ROM 104 and moreover, it is able to obtain color image data transmitted from another computer 106 via the Internet 105. In conformance to the image processing program achieved in the embodiment, image processing is executed on color image data obtained from any of the sources described above to reduce the extents of color mottling and color moiré.

The Mechanism with which Color Moiré Manifests

First, the mechanism with which color moiré manifests is explained. In the digital camera 102, an image of a subject is captured at an image sensor (not shown) that includes color filters each corresponding to a single color component among R (red), G (green) and B (blue), disposed in a Bayer array, and color image data are thus generated. At each of the pixels constituting the color image data, color information corresponding to a single color component among R, G and B is available. In the embodiment, the color image data in this state are taken into the personal computer 101. Using the RGB image data in the RGB colorimetric system that contain color information on a single color component among R, G and B in correspondence to each pixel, luminance information on a luminance component Y and color difference information on color difference components Cr and Cb are generated for each of the pixels at the personal computer 101.

Various methods for generating luminance information and color difference information respectively corresponding to the Y component and the Cb and Cr components for each of the pixels by using image data expressed in an RGB colorimetric system and containing color information on a single color component among R, G and B in correspondence to each pixel have been proposed to date. For instance, color information on the R component, the G component and the B component may be first generated in correspondence to each of the pixels through interpolation processing executed by taking into consideration similarity manifesting relative to nearby pixels, and then luminance information and color difference information corresponding to the Y component and the Cb and Cr components may be generated by using the RGB color information having been thus generated. Alternatively, International Publication No. WO02/21849 submitted by the inventor of the present invention discloses a method in which luminance information and color difference information corresponding to the Y component and the Cr and Cb components are directly generated by using image data expressed in the RGB colorimetric system and containing color information on a single color component among R, G and B in correspondence to each pixel, instead of generating color information on all the color components R, G and B in correspondence to each of the pixels first. In either of these methods, the interpolation processing and other arithmetic processing are executed by using color information corresponding to the individual color components available at pixels present in the vicinity of the target pixel.

The YCbCr plane thus generated first undergoes various types of image processing and then is converted back to image data expressed in the RGB colorimetric system as necessary. As a result, a high-quality color image with high resolution constituted with color information corresponding to all the color components R, G and B which is generated in correspondence to each of the pixels, is achieved.

In a Bayer array, filters each corresponding to one color component among R, G and B colors are disposed at positions offset from one another, as shown in FIG. 2 in reference to which the first embodiment has been explained. Let us now consider a case in which an image of a subject with a flat hue plane and a high frequency component contained only in its luminance plane is captured with an image sensor having color filters disposed in such a Bayer array. Color moiré may manifest in the color image obtained as the final result by generating luminance information and color difference information corresponding to the Y component and the Cb and Cr components for all the pixels through a method in the related art. This color moiré is assumed to be attributable to a cyclical error allowed to occur in the color difference information on the Cr component and the Cb component, which causes color moiré regardless of whether or not the Y component luminance information is correctly restored.

Figure 8:
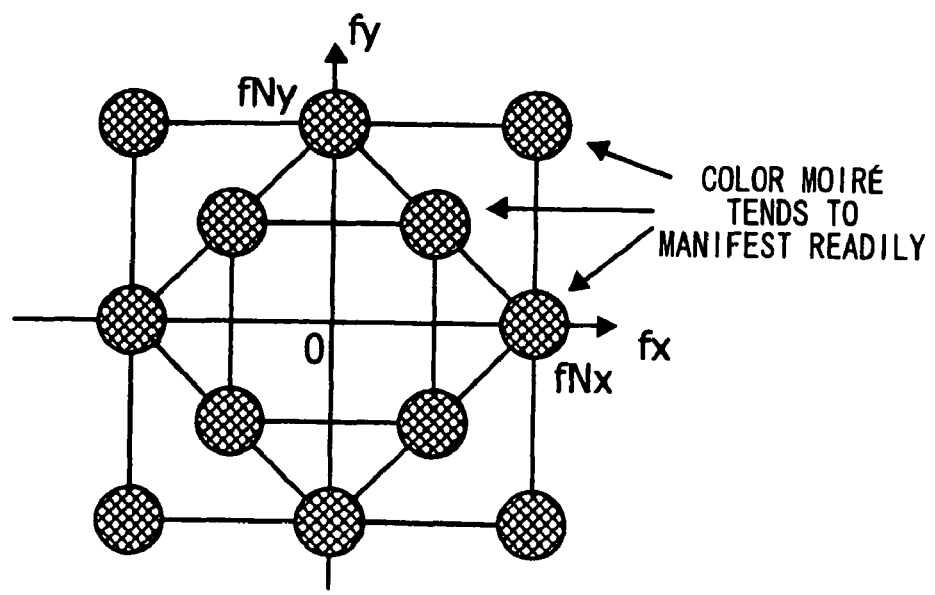
FIG. 8 shows points where color moiré is likely to manifest in the frequency space of a Bayer array.

FIG. 8 shows points where color moiré tends to occur in the frequency space of the Bayer array. In FIG. 8 an x axis extends along the horizontal direction and a y axis extends along the vertical direction. fNx indicates the Nyquist frequency along the x axis, whereas fNy indicates the Nyquist frequency along the y axis. FIG. 8 indicates that color moiré tends to occur readily near the Nyquist frequency.

Figure 9:
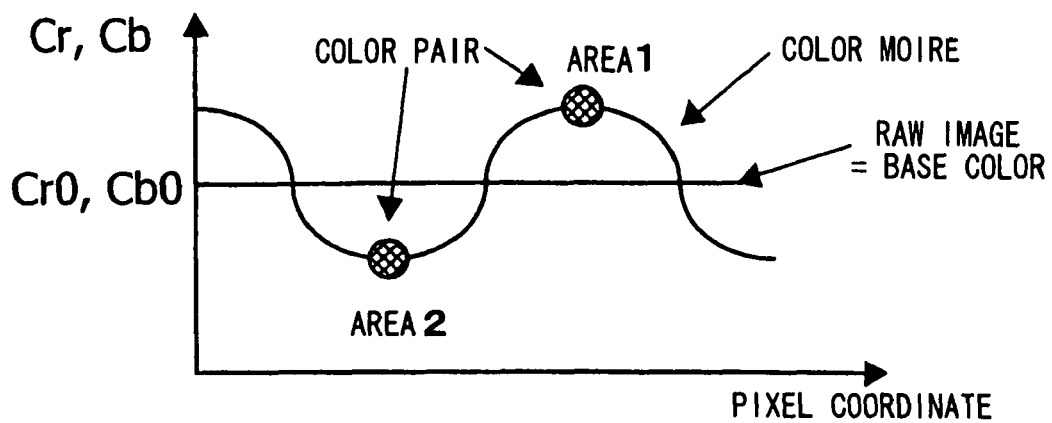
FIG. 9 presents a graph of the color difference information values (color difference values) at pixels where color moiré manifests.

FIG. 9 is a graph of color difference information values (color difference values) indicated at pixels where color moiré manifests. The pixel coordinates are indicated along the horizontal axis and the color difference values are indicated along the vertical axis. When color difference values remain constant, there is no change in color and the color remains uniform. Reiteration of a color difference value corresponding to the Cr color difference component or the Cb color difference component over constant cycles, such as that shown in FIG. 9, indicates that colors in a specific combination alternate in correspondence to pixel positions. In other words, it indicates the occurrence of color moiré. Cr0 or Cb0 represents the color difference value in the raw image, i.e., of the base color.

Figure 10:
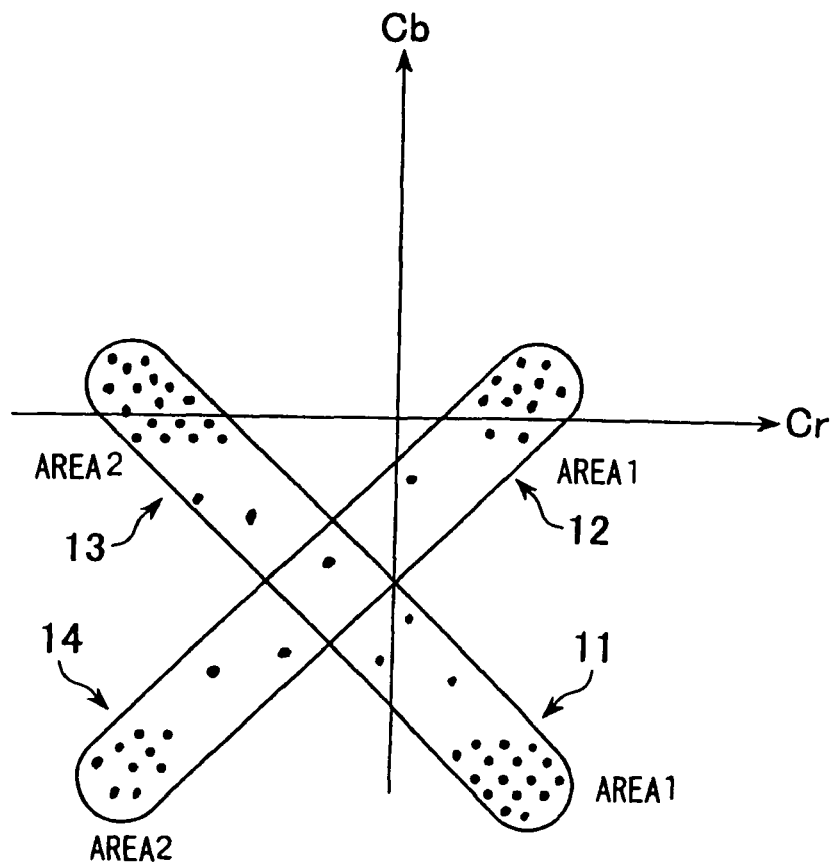
FIG. 10 illustrates a color moiré phenomenon by using the CrCb coordinate system.

In a CrCb coordinate system with its horizontal axis representing the Cr value and its vertical axis representing the Cb value, in which the color difference values in one area 1 where color moiré manifests and in another area 2 where color moiré also manifests are plotted, the phenomenon shown in FIG. 10 is observed. CrCb values at pixels in an area 1 are plotted over areas 11 and 12, whereas CrCb values at pixels in an area 2 are plotted over areas 13 and 14. The areas 11 and 13 paired together are located on the straight line with and angle of approximately −45° in the CrCb coordinate system, whereas the areas 12 and 14 paired together are located on the straight line with and angle of approximately +45° on the CrCb coordinate system. These pairs of CrCb data plotted on the straight line with an angle of −45° and the straight line with an angle of +45° are referred to as color pairs. A greater number of color pairs are plotted on the −45° line than the number of color pairs plotted on the +45° line.

Angle of −45°

With regard to a color pair on the −45° line, the concept that "errors behave differently in the two sets of data making up the color pair and canceled out with nearby pixels having undergone interpolation processing in response to a change in the luminance plane" can applies. Namely, the error can be canceled out as if the law of energy conservation were at work with regard to the nearby pixel.

FIG. 11 illustrates this concept. The luminance component (Y component) generated for the R pixel in area 1 through colorimetric system conversion processing assumes a value obtained by averaging the values in the data of a finely delineated pattern around the Nyquist frequency, i.e., the middle value between the trough and the peak. If the peak is present at the R pixel position, an error $-\Delta E$ manifests there and an error $+\Delta E$ manifests at the B pixel position where the trough is present. The concept can be expressed as in (101) and (102) below. Yr1 and Yb1 in the expressions below indicate the correct Y component values that should be obtained through calculation.

$$Yr1' = Yr1 - \Delta E \quad (101)$$

$$Yb1' = Yb1 + \Delta E \quad (102)$$

When the errors $\pm\Delta E$ having entered the luminance component as described above are propagated onto the color difference plane, the color difference component Cr1' corresponding to the R pixel in area 1 is expressed as in (103) below. In addition, the color difference component Cb1' corresponding to the B pixel in area 1 is expressed as in (104). In the expressions below, R1 indicates the value of the R component color information at the R pixel in area 1, B1 indicates the value of the B component color information at the B pixel in area 1 and Cr1 and Cb1 indicate the correct color difference values that should be obtained through calculation.

$$\begin{aligned} Cr1' &= R1 - Yr1' \\ &= R1 - Yr1 + \Delta E \\ &= Cr1 + \Delta E \end{aligned} \quad (103)$$

$$\begin{aligned} Cb1' &= B1 - Yb1' \\ &= B1 - Yb1 + \Delta E \\ &= Cb1 + \Delta E \end{aligned} \quad (104)$$

It is to be noted that since the color difference component Cb1' at the nearby B pixel and the like are used to generate the color difference component Cb for the R pixel, an error similar to that occurring at the B pixel described above manifests. Likewise, the color difference component Cr1' at the nearby R pixel and the like are used to generate the color difference component Cr for the B pixel, an error similar to that occurring at the R pixel described above manifests.

In the other area making up the color pair, i.e., area 2 in the color pair, the behavior is reversed from that in area 1 and thus, an error $+\Delta E$ enters the luminance component generated for the R pixel and an error $-\Delta E$ enters the luminance component generated for the B pixel. As a result, the Y component Yr2' expressed as in (105) below is generated for the R pixel in area 2 and the Y component Yb2' expressed as in (106) is generated for the B pixel in area 2. In addition, the color difference component Cr2' corresponding to the R pixel in area 2 and the color difference component Cb2' corresponding to the B pixel in area 2 are respectively indicated as in expressions (107) and (108) below.

$$Yr2' = Yr2 + \Delta E \quad (105)$$

$$Yb2' = Yb2 + \Delta E \quad (106)$$

$$\begin{aligned} Cr2' &= R2 - Yr2' \\ &= R2 - Yr2 - \Delta E \\ &= Cr2 - \Delta E \end{aligned} \quad (107)$$

-continued $$Cb2' = B2 - Yb2' \qquad (108)$$
$$= B2 - Yb2 + \Delta E$$
$$= Cb2 + \Delta E$$

FIG. 12 shows the concept expressed in (103), (104), (107) and (108) in the CrCb coordinate system. Since the image undergoing the processing is assumed to contain no change in hue, Cr1=Cr2=Cr0 and Cb1=Cb2=Cb0. Cr0 and Cb0 represent the color difference components of the base color. The corresponding points in FIG. 12 substantially match those of the color pairs present on the −45° line in FIG. 10.

Angle of +45°

With regard to a color pair present on the +45° line, the concept that "errors are canceled out in the two sets of data making up the color pair and behave in a similar manner with nearby pixels having undergone interpolation processing as the luminance plane changes". Namely, the errors are canceled out within each pair as if in conformance to the law of energy conservation.

FIG. 13 illustrates this concept. Assuming that an error −ΔE enters the luminance component generated through colorimetric system conversion processing for the R pixel in area 1, the Y component Yr1' corresponding to the R pixel in area 1 is expressed as in (109) below. At the closest B pixel undergoing interpolation, behavior identical to that at the R pixel occurs and, as a result, an error −ΔE manifests. Accordingly, the Y component Yb1' corresponding to the B pixel in area 1 is expressed as in (110). The color difference component Cr1' corresponding to the R pixel in area 1 and the color difference component Cb1' corresponding to the B pixel in area 1 are respectively expressed as in (111) and (112) below.

$$Yr1' = Yr1 - \Delta E \qquad (109)$$

$$Yb1' = Yb1 - \Delta E \qquad (110)$$

$$Cr1' = R1 - Yr1' \qquad (111)$$
$$= R1 - Yr1 + \Delta E$$
$$= Cr1 + \Delta E$$

$$Cb1' = B1 - Yb1' \qquad (112)$$
$$= B1 - Yb1 + \Delta E$$
$$= Cb1 + \Delta E$$

In the other area making up the color pair, i.e., area 2 in the, the behavior is reversed from that in area 1 and thus, an error +ΔE enters the luminance component generated for the R pixel and an error +ΔE also enters the luminance component generated for the B pixel. As a result, the Y component Yr2' expressed as in (113) below is generated for the R pixel in area 2 and the Y component Yb2' expressed as in (114) is generated for the B pixel in area 2. In addition, the color difference component Cr2' corresponding to the R pixel in area 2 and the color difference component Cb2' corresponding to the B pixel in area 2 are respectively indicated as in expressions (115) and (116) below.

$$Yr2' = Yr2 + \Delta E \qquad (113)$$

$$Yb2' = Yb2 + \Delta E \qquad (114)$$

-continued $$Cr2' = R2 - Yr2' \qquad (115)$$
$$= R2 - Yr2 - \Delta E$$
$$= Cr2 - \Delta E$$

$$Cb2' = B2 - Yb2' \qquad (116)$$
$$= B2 - Yb2 - \Delta E$$
$$= Cb2 - \Delta E$$

Figure 14:
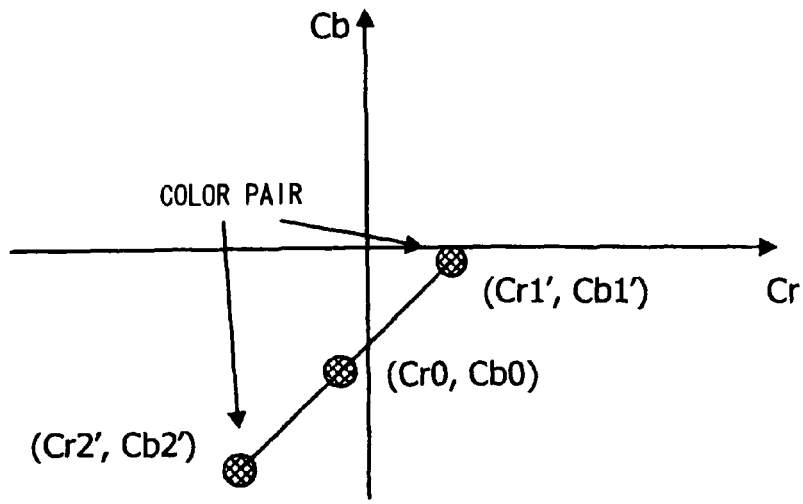
FIG. 14 shows the color pair present on the straight line extending at the +45° angle in the CrCb coordinate system.

FIG. 14 shows the concept expressed in (111), (112), (115) and (1116) in the CrCb coordinate system. Since the image undergoing the processing is assumed to contain no change in hue, Cr1=Cr2=Cr0 and Cb1=Cb2=Cb0, as shown in FIG. 12. The corresponding points in FIG. 14 substantially match the color pairs present on the +45° line in FIG. 10.

Thus, if a color pair with regard to the target pixel (subject pixel) can be detected on a straight line at an angle of −45° or +45° in a color difference plane generated through colorimetric system conversion processing or the like, it can be logically surmised that corresponding errors that cause color moiré are contained there. Accordingly, a color difference plane free of error can be generated by replacing the color difference values at the pixels constituting the detected color pair with the average values of the color difference values within the color pair. As a result, a color image with a minimum extent of color moiré can be obtained. It has been also confirmed that this method is also effective in reducing the extent of randomly occurring color mottling noise. It is to be noted that the principle of color mottling noise removal has already been explained in reference to the first embodiment.

Figure 15:
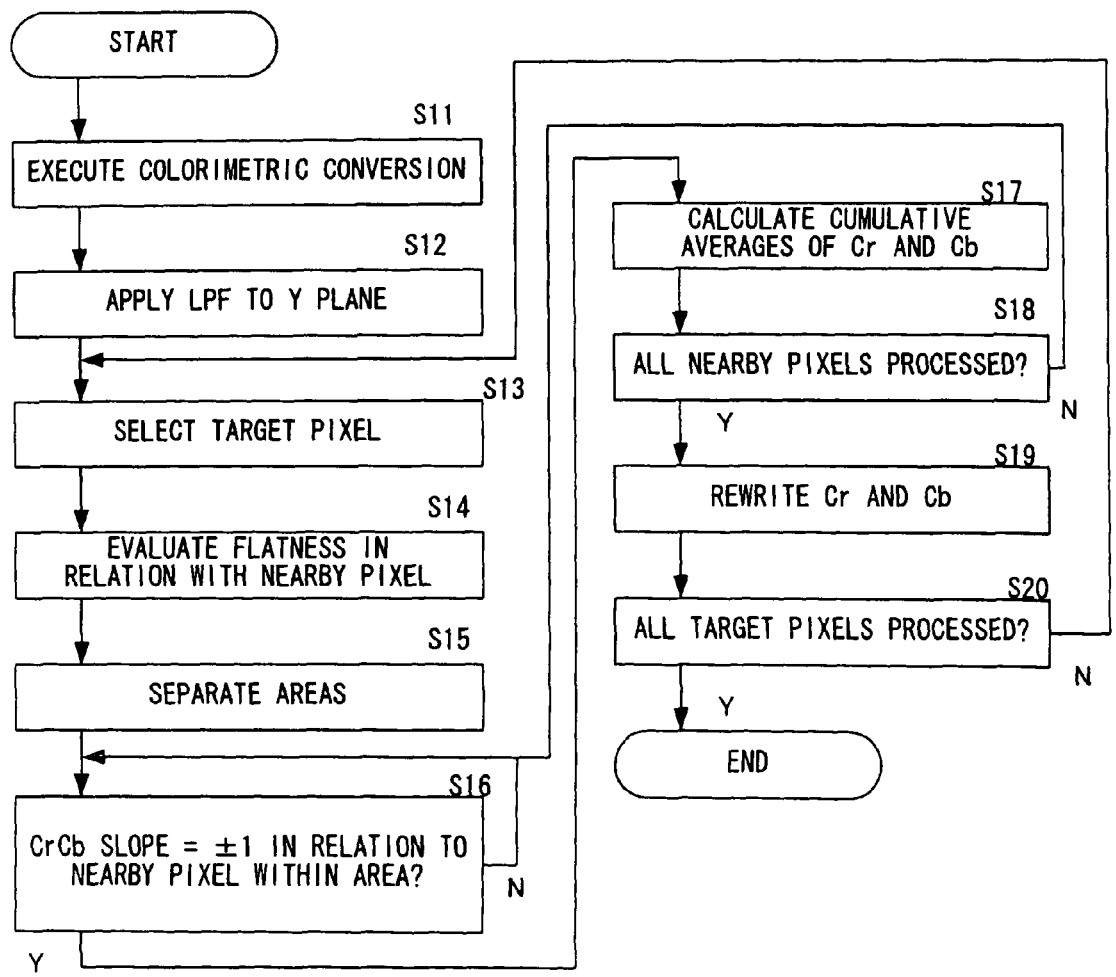
FIG. 15 presents a flowchart of the control executed in the second embodiment in conformance to the image processing program.

FIG. 15 presents a flowchart of the control executed in conformance to the image processing program achieved in the embodiment. In step S11, YCbCr image data having undergone colorimetric system conversion are obtained. The image data corresponding to the Y component, the Cb component and the Cr component are generated through any of various methods by using RGB image data containing color information on a single color component among R, G and B in correspondence to each pixel.

In step S12, a low pass filter (LPF) is applied to the Y plane. This low pass filter processing may be executed as expressed in (117) below. [i,j] indicates the coordinates of the pixel undergoing the filter processing.

$$Y[i,j] = \left\{ \begin{array}{c} 4*Y[i,j] + \\ 2*\left( \begin{array}{c} Y[i-1,j]+Y[i+1,j]+ \\ Y[i,j-1]+Y[i,j+1] \end{array} \right) + \\ 1*\left( \begin{array}{c} Y[i-1,j-1]+Y[i+1,j-1]+ \\ Y[i-1,j+1]+Y[i+1,j+1] \end{array} \right) \end{array} \right\} \Big/ 16 \qquad (117)$$

The low pass filter is applied in this step so as to enable extraction of an area with a spatial frequency close to the Nyquist frequency through subsequent processing.

In step S13, the target pixel (subject pixel) is selected. In step S14, the extent of flatness manifesting at the target pixel in relation with nearby pixels is evaluated by using the Y plane data having undergone the low pass filter processing in step S12. In step S15, an area having been determined to be flat is separated from an area having been determined to be non-flat. An image in a range close to the Nyquist frequency becomes flat after undergoing low pass filter processing such as that described above. Thus, the area having been distinguished as a flat area can be extracted as an area in a range near the Nyquist frequency.

In step S16, the slope of the straight line connecting the target pixel and a nearby pixel contained in the area having been determined to be flat in step S15 in the CrCb coordinate system is evaluated. If the slope is ±1, the operation proceeds to step S17, whereas if the slope is judged to the other than ±1, the processing in step S16 is executed again in conjunction with another nearby pixel. The nearby pixels should be contained within a range where two colors manifesting color moiré are present. These may be 33×33 pixels surrounding the target pixel.

By making a judgment as to whether or not the slope is ±1, it is determined whether the target pixel and the nearby pixel constitute a color pair on the +45° line or the −45° line explained earlier. More specifically, if the condition expressed in (118) below is satisfied, the line is determined to extend at an angle of +45° (slope=1), whereas if the condition expressed in (119) below is satisfied, the line is determined to extend at an angle of −45° (slope =−1), with Cr1 and Cb1 representing the values of the color difference components corresponding to the target pixel and Cr2 and Cb2 representing the values of the color difference components corresponding to the nearby pixel.

$$Cr1-Cr2=Cb1-Cb2 \tag{118}$$

$$Cr1-Cr2=Cb2-Cb1 \tag{119}$$

By taking into consideration the probable error, the following expressions (120) and (121) may be used in place of expressions (118) and (119). th should take a values such as 0.2 or 0.5. "±th" in the expressions below means "a value equal to or within ±th".

$$(Cb1-Cb2)/(Cr1-Cr2)=1\pm th \tag{120}$$

$$(Cb1-Cb2)/(Cr1-Cr2)=-1\pm th \tag{121}$$

In step S17, the cumulative averages of the Cr values and the Cb values at the pixels having been determined to be present on the straight line with the slope +1 and the cumulative averages of the Cr values and the Cb values at the pixels having been determined to be present on the straight line with the slope −1 are individually calculated. The cumulative averages are calculated by using expressions (122) through (125) below for the pixels present on the line with the slope +1 (+)45°, whereas the cumulative averages are calculated by using expressions (126) through (129) below for the pixels present on the line with the slope −1)(−45°. SumCr and SumCb respectively include the color difference values Cr1 and Cb1 corresponding to the target pixel and the expressions containing SumCr and SumCb each indicate that the color difference component values Cr2 or Cb2 at the nearby pixels determined to present on the line with the slope +1 or −1 are sequentially added. The expressions containing AveCr and AveCb each indicate that the average is calculated by dividing the cumulative value SumCr or SumCb by the number N of pixels having been counted. N should be the value representing the sum of the number of actually counted pixels plus one since it should include the target pixel.

$$+45SumCr=+45SumCr+Cr2 \tag{122}$$

$$+45SumCb=+45SumCb+Cb2 \tag{123}$$

$$+45AveCr=+45SumCr/N \tag{124}$$

$$+45AveCb=+45SumCb/N \tag{125}$$

$$-45SumCr=-45SumCr+Cr2 \tag{126}$$

$$-45SumCb=-45SumCb+Cb2 \tag{127}$$

$$-45AveCr=-45SumCr/N \tag{128}$$

$$-45AveCb=-45SumCb/N \tag{129}$$

In step S18, a decision is made as to whether or not all the nearby pixels have been processed. If it is decided that there is still a nearby pixel to be processed, the operation returns to step S16 to repeatedly execute the processing. Once it is decided that all the nearby pixels have been processed, the operation proceeds to step S19. In step S19, Cr and Cb of the target pixel are rewritten with the cumulative averages of the pixels having been determined to have the slope +1 or the slope −1 with the higher count.

In step S20, a decision is made as to whether or not all the target pixels have been processed. If it is decided that there is still a target pixel to be processed, the operation returns to step S13 to repeatedly execute the processing. If, on the other hand, it is decided that all the target pixels have been processed, the processing ends.

The following advantages are achieved by using the image processing program in the second embodiment described above.

(1) Color noise such as color moiré and color mottling can be effectively eliminated without affecting normal hues to any significant degree.

(2) The processing can be executed on image data having undergone various types of colorimetric conversion and interpolation processing and, as a result, high-definition color image data achieving high image quality in which color noise such as color moiré and color mottling is minimized, are obtained.

(3) Since the arithmetic operation must be executed only for specific areas, i.e., areas around the Nyquist frequency, the processing load is reduced and, at the same time, color moiré can be reduced with a high degree of reliability.

It is to be noted that the image processing program achieved in the second embodiment may be provided in a recording medium such as a CD-ROM. In such a case, the CD-ROM 104 in FIG. 7 should be replaced with a CD-ROM having recorded therein the image processing program. The image processing program may be provided in a recording medium other than a CD-ROM. For instance, it may be provided on a DVD, a floppy (registered trademark) disk or magnetic tape. In addition, the image processing program may be provided via a transmission medium such as a communication line, a typical example of which is the Internet. In other words, the program may be converted to and transmitted as a signal on a carrier wave that carries the transmission medium. In such an application, the computer 106 in FIG. 7 should be replaced with a server computer that provides the image processing program. Thus, the image processing program can be distributed as a computer-readable computer program product adopting any of various modes including a recording medium and a carrier wave.

Figure 16:
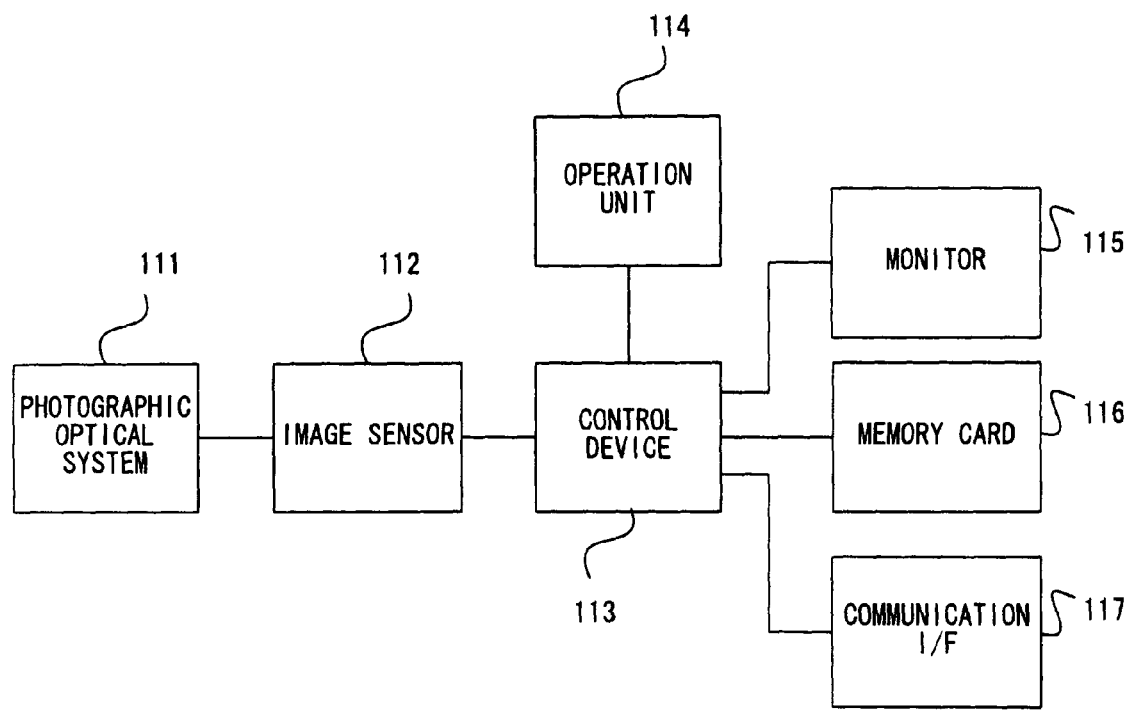
FIG. 16 is a block diagram showing the structure of a digital camera.

While an explanation is given above in reference to the second embodiment on an example in which the image processing program is executed on the personal computer 101, the present invention is not limited to this example. The image processing program may be installed in a digital camera (electronic camera) instead. FIG. 16 is a block diagram showing the structure that may be adopted in such a digital camera.

A photographic optical system 111 constituted with a photographic lens and the like forms a subject image on an image-capturing surface at an image sensor 112. The image sensor 112, which includes color filters disposed in a Bayer array as described earlier, obtains the subject image and generates color image data expressed in the RGB colorimetric system. The image sensor 112 may be constituted with, for instance, a CCD. The RGB color image data are transmitted to a control device 113 which then executes various types of image processing including the image processing explained earlier. Namely, the image processing program is executed by the control device 113. An operation unit 114 includes a shutter release button and various switches. Color image data generated through the image processing executed by the control device 113 are displayed at a monitor 115 and are stored into a memory card 116. The image data stored in the memory card 116 can be transmitted to an external personal computer or the like via a communication I/F 117. The digital camera may adopt a structure other than that shown in FIG. 16.

While an explanation is given above in reference to the second embodiment on an example in which a low pass filter is applied to the image data to enable extraction of an area around the Nyquist frequency, the present invention is not limited to this example. Instead of extracting an area around the Nyquist frequency, the color pair detection processing may be executed for all the pixels surrounding the target pixel within a specific range in correspondence to each target pixel. In more specific terms, the processing in steps S12, S14 and S15 in FIG. 15 may be omitted.

In the second embodiment, the Y, Cb and Cr components are generated in correspondence to the individual pixels. The term "pixel" used in this context does not necessarily have a one-to-one correspondence with the pixels at the image sensor. The term "pixel" is used to refer to a single unit of image data. For instance, while a pixel at the image sensor may constitute a single unit of image data, each four-pixel block that includes one R pixel, two G pixels and one B pixel in the Bayer array may be regarded as a single unit of image data (e.g., the image data unit shown in FIGS. 11 and 13) and the Y, Cb and Cr components may be generated in correspondence to the units of individual four-pixel blocks.

While an explanation is given above in reference to the second embodiment on an example in which the Y component is generated as the luminance component, the present invention is not limited to this example. For instance, the G component may be directly used as the luminance component. In such a case, G plane interpolation processing must be executed. The color difference component Cr may be calculated as R−G and the color difference component Cb may be calculated as B−G. When image data having undergone such G plane interpolation are used, too, errors that will cause color moiré or color mottling will be introduced and thus, processing similar to that executed in the second embodiment will be equally effective.

While an explanation is given above in reference to the second embodiment on an example in which the cumulative averages of the values indicated at a plurality of nearby pixels are calculated based upon their sums when the target pixel and the nearby pixels constitute color pairs on the −45° (or +)45° line, the present invention is not limited to this example. The basic concept of the second embodiment is simply that when a given pixel and another pixel form a color pair present on the −45° (or +45°) line in the CrCb coordinate system, errors can be corrected by replacing the color difference values corresponding to each pixel with the average values calculated by using the color difference values at both pixels.

While an explanation is given above in reference to the second embodiment on an example in which the color difference components are used as components representing the hue, i.e., the color, the present invention is not limited to this example. Other components that indicate the hue may be used instead. For instance, the ratio of the R component and the Y component and the ratio of the B component and the Y component, i.e., R/Y and B/Y, may be used as an alternative. In addition, the data may be converted to another colorimetric system and color components in the other colorimetric system may be used.

In the second embodiment, the processing is executed in the YCbCr color space. A prerequisite to such processing is that the YCbCr color space has been generated through interpolation processing or the like. Namely, the processing achieved in the embodiment is highly effective when it is executed in a color space on which arithmetic operations such as interpolation processing that will introduce errors has been executed.

In the second embodiment, color pairs present on the −45° line and color pairs present on the +45° line are detected in the CbCr coordinate system. The color differences with regard to the base color can be determined by averaging the Cb values and the Cr values at the pixels constituting these color pairs. In other words, the pixels in a color pair may be regarded to have a relationship of so-called complementary similarity relative to the base color. The term "relationship of complementary similarity" in this context refers to the relationship whereby the base color is achieved by mixing the colors at the pixels in the color pair, which applies to pixels present on the −45° line or the +45° line in the CbCr coordinate system. From another perspective, this relationship may be characterized as the color difference values (hue values) at the pixels in the color pair being symmetrical to each other relative to the color difference values of a given color.

When detecting the color pairs, limitations such as the chromaticity being equal to or less than a predetermined level, the luminance distribution achieving a level equal to or greater than that of a predetermined frequency component or the luminance distribution achieving a level equal to or lower than that of a predetermined frequency component may be imposed as selection conditions. With such limitations imposed, the processing becomes faster and, at the same time, the extents of color moiré and color mottling can still be effectively reduced.

While an explanation is given above in reference to the second embodiment on an example in which the present invention is adopted to process a still image, the present invention is not limited to this example. For instance, the contents of the second embodiment may be effectively adopted in conjunction with motion images captured on a video camera.

While signals containing noise (error) are scattered fairly evenly over the entire image area in the first embodiment, the manifestation of color moiré in the second embodiment concentrates in the four corners of the quadrangle 21 of FIG. 3. However, the first embodiment and the second embodiment are both achieved based upon a single concept of noise (error) removal. In addition, color mottling noise is assumed to be present in an even distribution, as in the first embodiment. Accordingly, the processing explained in reference to the first embodiment should be effective in removing both color moiré and color mottling noise.

While the invention has been particularly shown and described with respect to preferred embodiments and variations thereof by referring to the attached drawings, the present invention is not limited to these examples and it will be understood by those skilled in the art that various changes in form and detail may be made therein without departing from the spirit, scope and teaching of the invention.

What is claimed is:

1. A signal correcting method performed by a control device that includes a processor, the method comprising:

Obtaining, by the control device, image data containing at least a first hue signal and a second hue signal in correspondence to each pixel; and Substituting, by the control device, a signal value of the first hue signal at a target pixel with an average of the signal value of the first hue signal at the target pixel and a signal value of the first hue signal at a nearby pixel, and a signal value of the second hue signal at the target pixel with an average of the signal value of the second hue signal at the target pixel and a signal value of the second hue signal at the nearby pixel, when the signal value of the first hue signal at the target pixel and the signal value of the first hue signal at the nearby pixel are determined to be symmetrical to each other relative to a signal value of the first hue signal corresponding to a specific color and the signal value of the second hue signal at the target pixel and the signal value of the second hue signal at the nearby pixel are determined to be symmetrical to each other relative to a signal value of the second hue signal corresponding to the specific color.

2. A computer-readable computer program product, comprising:

a non-transitory computer readable medium having recorded therein a signal correction processing program that enables a computer to execute steps in a signal correcting method according to claim 1.

3. A signal correction processing apparatus, comprising:

a control device that executes steps of a signal correcting method according to claim 1.

* * * * *